United States Patent
Ghosh

(10) Patent No.: US 7,161,973 B2
(45) Date of Patent: Jan. 9, 2007

(54) PILOT AIDED ADAPTIVE MINIMUM MEAN SQUARE INTERFERENCE CANCELLATION AND DETECTION

(75) Inventor: Arunabha Ghosh, Austin, TX (US)

(73) Assignee: SBC Properties, L.P., Reno, NV (US)

( * ) Notice: Subject to any disclaimer, the term of this patent is extended or adjusted under 35 U.S.C. 154(b) by 756 days.

(21) Appl. No.: 10/320,526

(22) Filed: Dec. 17, 2002

(65) Prior Publication Data

US 2004/0125863 A1    Jul. 1, 2004

(51) Int. Cl.
H04B 15/00    (2006.01)
H04K 1/00    (2006.01)
H04L 27/30    (2006.01)

(52) U.S. Cl. ...................... 375/147; 375/141
(58) Field of Classification Search ................ 375/147, 375/140, 144, 148, 316, 349, 350, 130
See application file for complete search history.

(56) References Cited

U.S. PATENT DOCUMENTS

| | | | |
|---|---|---|---|
| 5,329,547 A * | 7/1994 | Ling | 370/342 |
| 5,414,728 A * | 5/1995 | Zehavi | 375/142 |
| 5,694,388 A | 12/1997 | Sawahashi et al. | |
| 6,278,726 B1 | 8/2001 | Mesecher et al. | |
| 6,301,293 B1 | 10/2001 | Huang et al. | |
| 6,347,234 B1 | 2/2002 | Scherzer | |
| 6,369,757 B1 | 4/2002 | Song et al. | |
| 6,377,611 B1 | 4/2002 | Hwang | |
| 6,426,973 B1 | 7/2002 | Madhow et al. | |
| 6,901,122 B1 * | 5/2005 | Nadgauda et al. | 375/347 |
| 2002/0034267 A1 | 3/2002 | Chuang et al. | |
| 2002/0054632 A1 | 5/2002 | Chuang et al. | |
| 2002/0136158 A1 | 9/2002 | Frank | |
| 2003/0095529 A1 * | 5/2003 | Petre et al. | 370/342 |
| 2003/0146870 A1 * | 8/2003 | Guo et al. | 342/383 |
| 2004/0013171 A1 * | 1/2004 | Pan et al. | 375/147 |
| 2004/0028008 A1 * | 2/2004 | Kurihara | 370/320 |
| 2004/0046695 A1 * | 3/2004 | Brothers et al. | 342/427 |
| 2004/0114672 A1 * | 6/2004 | LaRosa et al. | 375/148 |

* cited by examiner

Primary Examiner—Jean B. Corrielus
(74) Attorney, Agent, or Firm—Greenblum & Bernstein, P.L.C.

(57) ABSTRACT

A modified adaptive minimum mean square error (MMSE) receiver detects a spread spectrum signal, minimizing interference among multiple users. The receiver receives multiple pilot bits and corresponding data bits. A channel is estimated using at least one of the received pilot bits and, simultaneously, the data bits are detected based on the pilot bit and an inverse of a gain of the receiver. The spectrum signal may be spread in accordance with a wideband code division multiple access (W-CDMA) format, in which the pilot bits are modified to include a predetermined bit sequence of alternating ones and negative ones.

22 Claims, 5 Drawing Sheets

PILOT AIDED ADAPTIVE MINIMUM MEAN SQUARE INTERFERENCE CANCELLATION AND DETECTION

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to the field of telecommunications. More particularly, the present invention relates to reducing interference in code division multiple access (CDMA) communication systems.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description, the acronyms are defined as follows:
Additive White Gaussian Noise (AWGN)
Binary Phase Shift Key (BPSK)
Code Division Multiple Access (CDMA)
Direct Sequence Code Division Multiple Access (DS-CDMA)
Inter-Symbol Interference (ISI)
Maximum Likelihood (ML)
Minimum Mean Square Error (MMSE)
Multi-Access Interference (MAI)
Multi-User Detection (MUD)
Single User Detection (SUD)
Orthogonal Variable Spreading Factor (OVSF)
Quaternary Phase Shift Key (QPSK)
Universal Mobile Telecommunications Systems (UMTS)
Wideband Code Division Multiple Access (W-CDMA)
Wide Sense Stationary Uncorrelated Scattering (WSSUS)

3. Background Information

The communications industry has experienced significant growth in the demand for wireless communications. The increased demand is related, in part, to the improved quality and reliability of wireless networks, including mobile cellular networks, which have essentially evolved through three generations. The first generation included analog systems that modulated voice signals onto radio frequency (RF) carrier waves, which were transmitted and received between base stations and mobile units. The second generation of cellular networks introduced digital encoding of analog voice signals, and included the time division multiple access (TDMA) and code division multiple access (CDMA) cellular systems. The second generation required a symmetric, full-duplex network and was directed to accommodation of voice traffic. The third generation of cellular systems includes packet-switched transmissions and can accommodate voice, data, audio and video communications.

With the increase in interest in commercial CDMA based mobile systems, as well as CDMA's dominance in third generation systems, research and development efforts have been directed to exploring receiver structures and detection techniques. CDMA systems belong to the genre commonly known as spread spectrum systems, the use of which is wide spread throughout wireless telecommunications. In spread spectrum systems, data from the transmitted signal is spread over a predetermined bandwidth, such that the transmission bandwidth of each transmitted signal is much higher than the actual data bandwidth. Therefore, numerous CDMA signals, originating from different users, are essentially spread and multiplexed onto the same transmission bandwidth. The signals corresponding to the different users are distinguishable by the CDMA receiver (or detector) based on the respective spreading codes or signatures.

CDMA systems include direct sequence CDMA (DS-CDMA), or direct sequence spread spectrum (DSSS), and frequency hopping CDMA. DS-CDMA, in particular, codes transmitted signals in sequential channels, combining the transmitted bits with a higher sampling rate chip sequence and spreading the signal according to a spreading ratio. Because each bit is, in essence, redundantly represented by multiple chips, a spread DS-CDMA data signal is more likely to be recovered by the receiver, even when portions of the data are lost or encounter interference during transmission. DS-CDMA includes various conventional coding schemes, such as IS-95, cdma2000 and wideband code division multiple access (W-CDMA).

The capacity of operational DS-CDMA systems is limited by cross-interference among the different user signals, all of which occupy the same frequency at the same time. The cross-interference among signals from different users is referred to as multi-access interference (MAI). Attempts to improve the capacity of CDMA systems included reducing the level of perceived interference among the users, including minimum mean square error (MMSE) detection. However, implementation of an adaptive MMSE detection scheme in universal mobile telecommunications systems (UMTS) requires major changes in the physical layer and the data link layer (layers 1 and 2, respectively) in the WCDMA air interface. Although a blind MMSE detection schemes (i.e., without training sequences) require only minor changes to W-CDMA air interface, they do not promise the kind of performance improvement as adaptive MMSE.

The receivers implemented in the second generation of CDMA systems were relatively simple matched filter based (correlation detectors) single user receivers. By the early 1990s, it became apparent that CDMA systems are not multi-access interference (MAI) limited. Rather, MAI was a limitation of the single-user Rake architecture incorporated into CDMA receivers. Therefore, the combined CDMA and Rake systems needed to be changed, or replaced, to minimize the MAI, as well as to account for internal signal interference (ISI), caused by other data bits transmitted from the same user.

Accordingly, the concept of multi user detection (MUD) was developed, by which a receiver jointly estimates all received signals from multiple transmission sources. However, an optimal MUD receiver, which is based on joint maximum likelihood (ML) estimation of all users, is impractical to implement because of the large computational complexity. MUD receivers are complex in CDMA systems because they must appropriately estimate the channels of all the users, as compared to a traditional single user detector, having the Rake architecture, which need only estimate a channel of a single user.

In a traditional CDMA system, the estimated parameters of the channel are $h_k(t)$ and $\tau_k$, the amplitude/phase variation and the delay associated with each path, respectively. In a maximal ratio combining process, the receiver compensates for the delay and the amplitude/phase variation to obtain the maximum possible signal to noise ratio. An inherent limitation of the Rake architecture is its inability to suppress the residual cross-correlation between signals with different signatures.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

BRIEF DESCRIPTION OF THE APPENDICES

Figure 1:
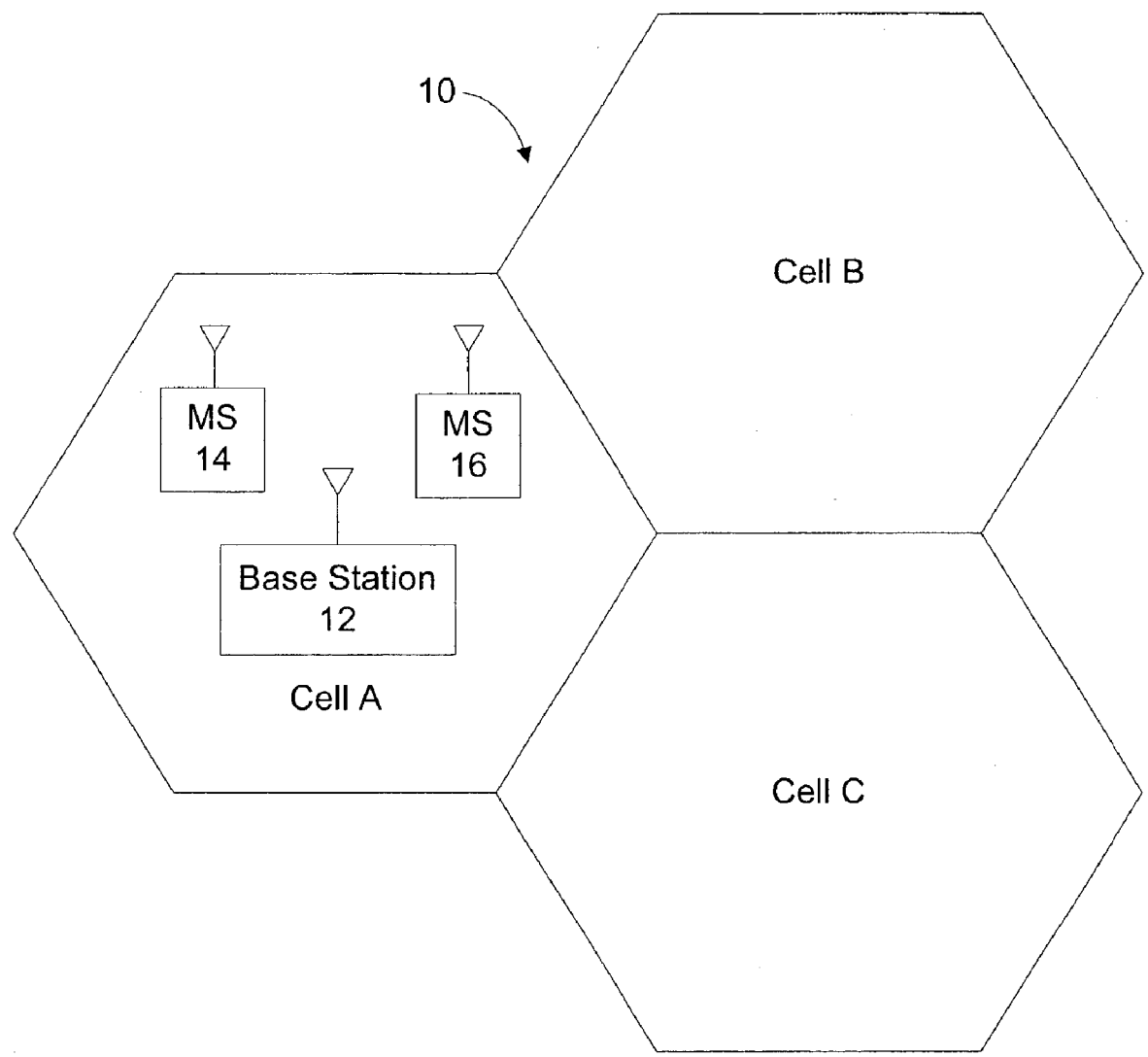
FIG. 1 is a block diagram showing an exemplary packet-based wireless telecommunications network, according to an aspect of the present invention.

Appendix A is a general background description of MMSE receivers, relating to aspects of the present invention; and Appendix B is a general background description of CDMA receivers with respect to time varying channel models, relating to aspects of the present invention.

DETAILED DESCRIPTION OF EMBODIMENTS

The present invention relates to a pilot aided, adaptive MMSE detection scheme with pilot aided joint channel estimation and data bit detection. It includes the existing features of a W-CDMA air interface, along with signal processing techniques to implement an adaptive MMSE detection scheme in a UMTS network. The adaptive MMSE architecture of the present invention requires minimal changes in the W-CDMA air interface and provides performance gains in the range of traditional MMSE architectures. Also, the MMSE detection scheme does not involve the traditional type of CDMA receiver, e.g., including Rake receiving and filtering, and improves the capacity of UMTS communication technology for voice and data.

The pilot aided adaptive MMSE detection receiver of the present invention minimally impacts W-CDMA protocol, yet improves capacity comparable to that of a traditional MMSE detection receiver. The adaptive MMSE detection receiver uses the common and/or dedicated pilot channels (already present in W-CDMA) to jointly estimate the channel and the signal in a single step. The underlying detection algorithm reduces the level of interference significantly, as compared to a traditional W-CDMA receiver, and accordingly improves the capacity of the network.

In view of the above, the present invention through one or more of its various aspects and/or embodiments is presented to accomplish one or more objectives and advantages, such as those noted below.

An aspect of the present invention provides a method detecting a spread spectrum signal, including pilot bits and corresponding data bits, at an adaptive MMSE error receiver. The method includes receiving the pilot bits and the corresponding data bits, estimating a channel using at least one of the pilot bits, and simultaneously detecting the data bits based on the pilot bit and an inverse of a gain of the receiver. The data bits may be spread in accordance with a W-CDMA format, while the pilot bits may be spread in accordance with a modified W-CDMA format, which includes a predetermined bit sequence of alternating ones and negative ones.

Simultaneously detecting the data bits may further include determining a phase reference with respect to the at least one pilot bit. Also, simultaneously detecting the data bits may be further based on a data bit estimation vector and a pilot bit estimation vector determined though sampling a predetermined number of received signals.

Another aspect of the present invention provides a method for detecting spread spectrum signals at an adaptive MMSE receiver, in which spread spectrum signals are received, including a pilot signal portion and a data signal portion. The pilot signal portion is estimated based on the multiple received spread signals and at least one pilot signal spreading sequence corresponding to the pilot signal portion. The data signal portion is estimated based on the received multiple spread signals and at least one data signal spreading sequence corresponding to the data signal portion. A data bit of the data signal portion is detected based on the estimated pilot signal portion, the estimated data signal portion and at least one pilot bit of the pilot signal portion. The pilot signal portion may be a common pilot signal or a dedicated pilot signal corresponding to the detected data bit.

Another aspect of the present invention provides a system for detecting a spread spectrum signal received at an adaptive MMSE receiver, including a demodulator, a channel estimator and a bit estimator. The spread spectrum signal includes multiple pilot bits and corresponding data bits. The demodulator demodulates the received pilot bits and data bits. The channel estimator estimates a channel using at least one of the pilot bits. The bit estimator detects the data bits, concurrently with the channel estimator estimating the channel, based on the at least one pilot bit and an inverse of a gain of the receiver. The bit estimator further base detection on an expectation value of the received signal, determined though sampling a predetermined number of received signals.

Another aspect of the present invention provides a system for detecting transmitted spread spectrum data at an adaptive MMSE receiver, including a demodulator, which receives and demodulates multiple received spread spectrum signals, and a covariance matrix calculator, which determines a received signal expectation value based on the received signals. The system further includes a channel estimator, which determines a pilot spreading sequence of the received signals and estimates at least one pilot portion of the received signals based on the pilot spreading sequence, and the expectation value, and a bit estimator which determines a bit spreading sequence of the received signals and estimates at least one data portion of the received signals based on the bit spreading sequence and the expectation value. A combiner combines the at least one pilot portion and the at least one data portion and estimates the transmitted spread spectrum data based on the combined pilot portion and data portion and a phase reference between the data portion and at least one pilot bit of the pilot portion. The at least one pilot bit may be a common pilot signal or a dedicated pilot signal, corresponding to the detected data.

Another aspect of the present invention provides computer readable medium, storing a computer program for detecting a spread spectrum signal at an adaptive MMSE receiver. The program includes a receiving source code segment, a channel estimating source code segment and a detecting source code segment. The receiving source code segment that receives pilot bits and corresponding plurality of data bits in the spread spectrum signal. The channel estimating source code segment estimates a channel using at least one of the pilot bits. The detecting source code segment detects the data bits, contemporaneously with the channel estimating source code segment estimating the at least one of pilot bit, based on the pilot bit and an inverse of a gain of the receiver. The detecting source code segment may contemporaneously detect the bits further based on a phase reference with respect to the at least one pilot bit or based on a data bit estimation vector and a pilot bit estimation vector determined though sampling a predetermined number of received signals.

Yet another aspect of the present invention provides a computer readable medium, storing a computer program for detecting spread spectrum signals at an adaptive MMSE receiver. A receiving source code segment of the computer program receives multiple spread signals, which include a pilot signal portion and a data signal portion. A pilot signal estimating source code segment estimates the pilot signal portion based on the spread signals and at least one pilot signal spreading sequence corresponding to the pilot signal portion. A data signal estimating source code segment estimates the data signal portion based on the received spread signals and at least one data signal spreading sequence corresponding to the data signal portion. A detecting source code segment detects a data bit of the data signal portion based on the estimated pilot signal portion, the estimated data signal portion and at least one pilot bit of the pilot-signal portion.

The various aspects and embodiments of the present invention are described in detail below.

The present invention is implementable in a wireless network, including the second generation and third generation cellular systems, such as the exemplary wireless network 10 of FIG. 1, which is implemented according to well known cellular communication techniques. The wireless network 10 includes cell A, cell B and cell C, located adjacent to one other. It is understood that, although only three cells are depicted, the number of cells in an actual wireless network is usually much larger. Cell A includes a base station 12, configured to enable communications with multiple wireless mobile stations, including for example mobile stations 14 and 16, which are shown as located within cell A. Cells B and C likewise include respective base stations (not pictured) that operate substantially the same as the base station 12. The mobile stations 14 and 16 may include wireless communication devices, such as cellular telephones, multi-media communicators, personal digital assistants (PDA), and the like, as well as devices such as desktop personal computers, laptop personal computers, facsimile machines, and the like, working through a cellular modem. Mobile stations 14 and 16 may move from cell to cell during the course of an active communication session, in which case cell A performs a coordinated handover or handoff to one of the adjacent cells, whenever one of the mobile stations travels into cell B or cell C.

The depicted base station 12 and mobile stations 14 and 16 have compatible transmitters and receivers to enable communications within the wireless network 10. The receivers are adaptive MMSE receivers that detect slightly modified CDMA signals in accordance with the present invention, a simplified example of which is depicted as receiver 200 in FIG. 2.

Figure 2:
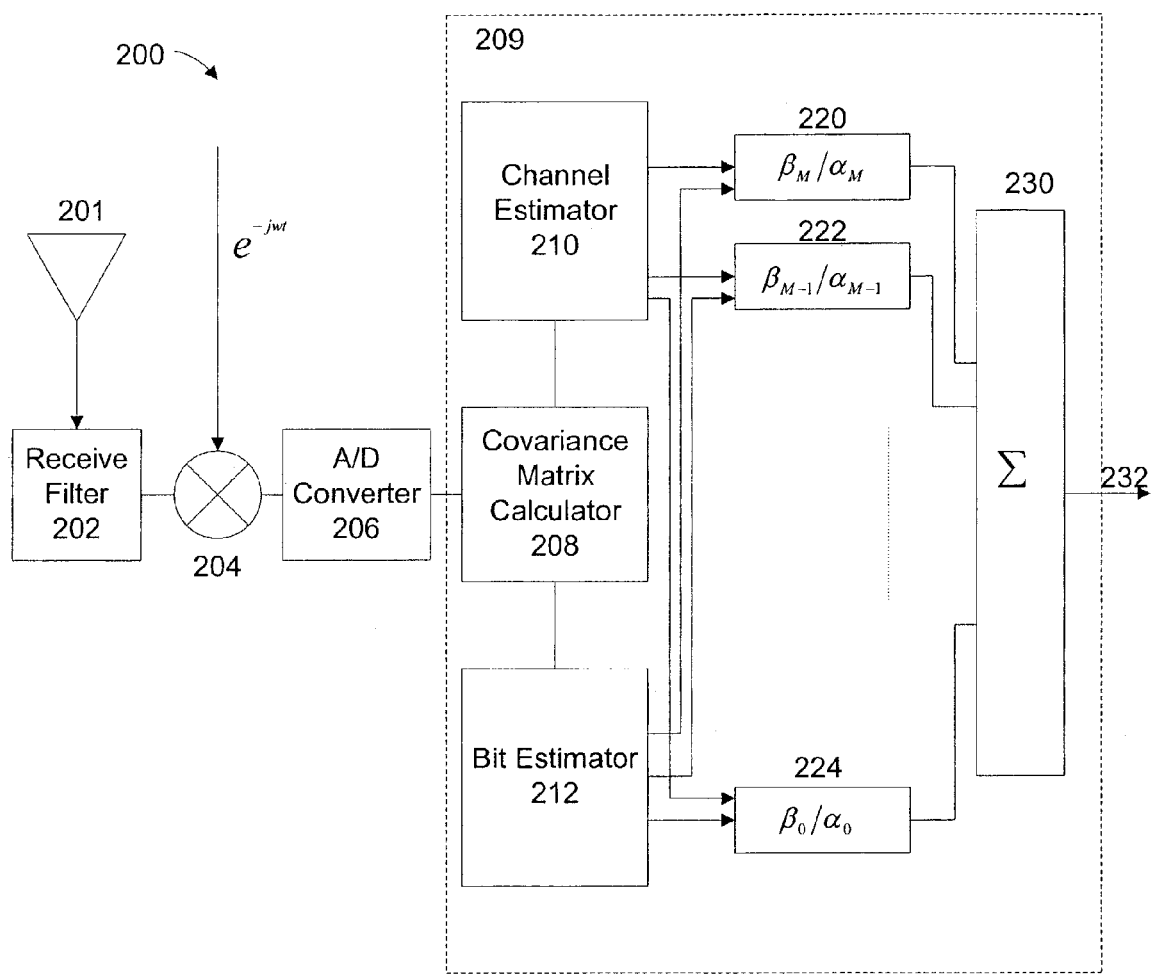
FIG. 2 is a block diagram showing an exemplary adaptive MMSE receiver, according to an aspect of the present invention.

Referring to FIG. 2, a transmitted data signal is spread on a radio frequency (RF) carrier and received at the antenna 201. The data signal passes through a band pass receive filter 202 and a multiplexer 204 to remove the RF carrier, indicated by $e^{-j\omega t}$, and to down convert the received signal from the pass band to a base band. The base band signal passes through an analog to digital (A/D) converter 206, such as a matched filter, to obtain the digital data of the originally transmitted signal. The digital data enters an adaptive MMSE algorithm processor 209, which includes a covariance matrix calculator 208, a channel estimator 210, a bit estimator 212, dividers 220–222 and a summation block 230. The functions of the adaptive MMSE algorithm processor 209, discussed in detail below, may be derived, for example, assuming discrete linear time varying channels, in an embodiment of the present invention. The receiver 200 outputs the detected data 232.

Figure 3:
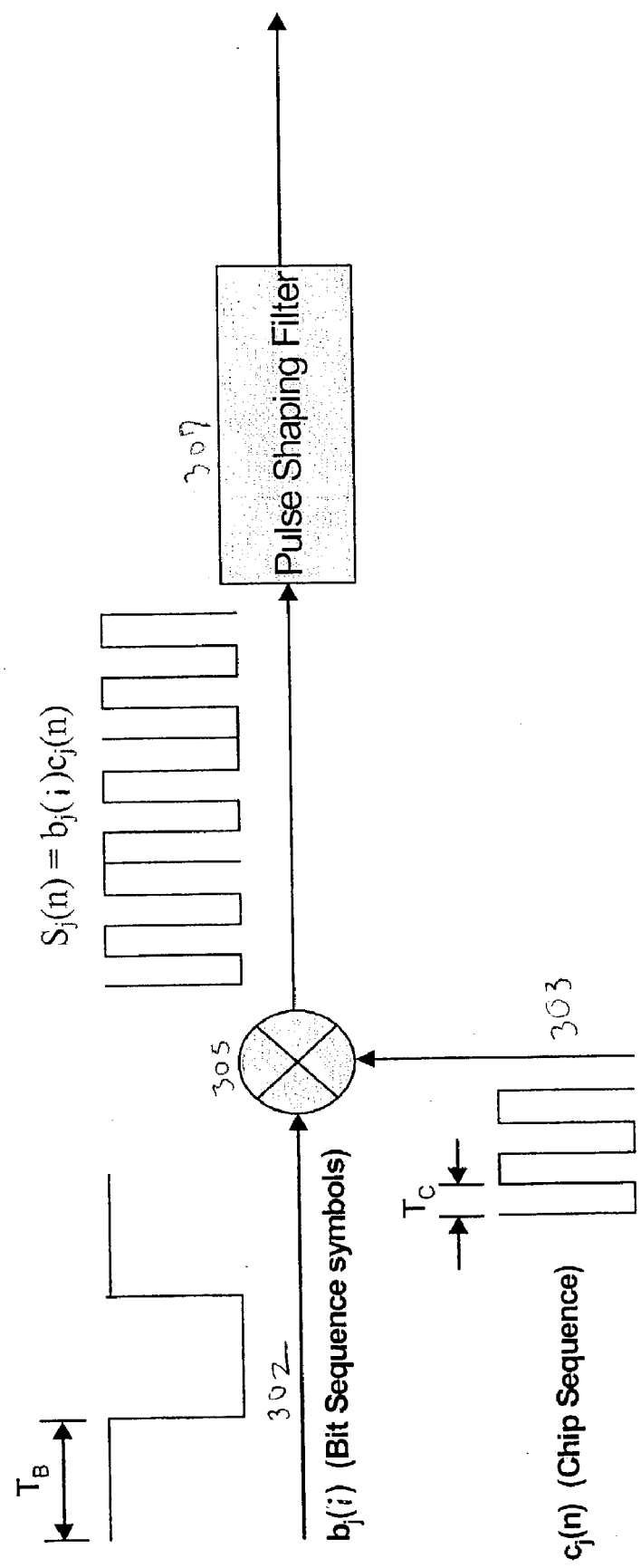
FIG. 3 is a simplified depiction of an exemplary CDMA signal, according to an aspect of the present invention.

As stated above, the receiver 200 detects DS-CDMA data, having a modified pilot signal. FIG. 3 illustrates a simplified, exemplary representation of a typical DS-CDMA signal transmitted for a single user. General background information regarding DS-CDMA theory is provided in Appendix B, the contents of which are incorporated by reference herein in its entirety. Each symbol or bit b is represented by series of chips c. The number of chips c in each bit b depends on the spreading configuration of the transmitter. Typically, a bit b is represented by a multiple of two chips, such as 16, 32 or 64 chips per bit.

As shown in FIG. 3, the bit sequence 302 for user j is represented by $b_j(i)$ and the chip sequence 303 (e.g., the spreading filter function), is represented by $c_j(n)$, where i is the bit index and n is the chip index within a given bit. $T_b$ and $T_c$ represent the bit duration and the chip duration in units of time, respectively, where $T_b$ is equal to $T_c$ multiplied by the processing gain N (i.e., $T_b = N T_c$). Both sequences are assumed to be binary, although in many conventional DS-CDMA systems, the sequences are not binary due to higher forms of modulation and complex spreading processes. The simplistic representation of the DS-CDMA signal in FIG. 3 aids in developing basic algebraic relationships incorporated into the adaptive MMSE algorithm processor 209.

The bit sequence $b_j(i)$ is multiplied by the chip sequence $c_j(n)$ at 305 to create a combined data sequence, represented as $S_j(n) = b_j(i) c_j(n)$. The spreading of the data sequence is represented by a pulse shaping filter 307, which is user specific. Accordingly, the continuous, transmitted signal s at time t is represented as:

$$s(t) = \sum_{i=-\infty}^{+\infty} b[i] \sum_{n=0}^{N-1} c_{n+iN} f(t - iT_s - nT_c) \quad (1)$$

where the spreading filter can be represented by $$\sum_{n=0}^{N-1} c_{n+iN} f(t - iT_s - nT_c).$$

Equation (1) does not assume that the spreading function is stationary. In other words, equation (1) does not assume that the chip sequence $c_j(n)$ is the same for every bit $b_j$, which is the case in many DS-CDMA systems in which the orthogonal spreading codes, such as Hadamard and orthogonal variable spreading factor (OVSF) codes, are multiplied by long scrambling codes (i.e., PN sequences), such as IS-95, cdma2000 and W-CDMA. For example, the PN sequences for IS-95 and cdma2000 are ML shift register sequences and for W-CDMA are Gold codes. The dependence of the chip sequence $c_j(n)$ on the bit index i makes the spreading filter non-stationary. However, in practical CDMA systems, the spreading sequence repeats after a fixed interval, making the spreading filter cyclo-stationary, which needs to be incorporated in the receiver structure as well.

The received signal r at time t for a single user, after propagation though the wireless channel, is given by:

$$r(t) = \int_{-\infty}^{+\infty} h(t, \tau) s(t - \tau - \zeta) d\tau + \eta(t) \quad (2a)$$

where, in the case of a wide sense stationary uncorrelated scattering (WSSUS) channel, $\tau$ is path delay, $h(t, \tau)$ is channel function, $\zeta$ is propagation delay, $s(t-\tau-\zeta)$ is the continuous transmitted signal corrected for delay, $\eta(t)$ is thermal noise (modeled as additive white Gaussian noise (AWGN)) at time t. The propagation delay $\zeta$ may be incorporated in the channel model itself, but for the sake of clarity and simplicity, the propagation delay $\zeta$ is considered a separate variable.

Substituting equation (1) for the continuous transmitted signal $s(t-\tau-\zeta)$, the received signal r at time t for a single use is represented as:

$$r(t) = \sum_{i=-\infty}^{+\infty} b[i] \sum_{n=1}^{N} c_{n+iN} \int_{-\infty}^{+\infty} h(t, \tau) f(t - \tau - iT_s - nT_c) d\tau + \eta(t) \quad (2b)$$

In a MUD system, the received signal r(t) is a conglomerate of superimposed signals transmitted by the multiple users. When the user index is represented by k for a total of L users, the total received signal at the receiver in the MUD system is derived from equation (2b) as:

$$r(t) = \sum_{k=1}^{L} r^{(k)}(t) \quad (3a)$$

$$r(t) = \sum_{k=1}^{L} \left[ \sum_{i=-\infty}^{+\infty} b^{(k)}[i] \sum_{n=1}^{N} c_{n+iN}^{(k)} \int_{-\infty}^{+\infty} h^{(k)}(t, \tau) f(t - \tau - iT_s - nT_c) d\tau \right] + \eta(t) \quad (3b)$$

where it is assumed that the pulse shaping filter 307 is the same for all the users.

At the receiver, the analog signal is converted to a digital signal through a match filter (matched to the pulse shaping filter 307 at the transmitter). In the case of the downlink model for CDMA systems, such as IS-95, cdma2000 and W-CDMA, all of the received signals (from the same base station) may be modeled with the same channel function h and same propagation delay $\zeta$. In the uplink, however, the different signals are treated in an asynchronous manner. In other words, each channel function h and propagation delay $\zeta$ are different for each of the different users.

Assuming that k=1 represents the signal from the desired user, each of the remaining signals (k≠1) are treated as interfering signals. The receiver is therefore time synchronized to k=1, which implies that the discrete representation of the received signal $r_n$ is given by:

$$r_n[i] = \int_{iT_s+nT_c}^{iT_s+(n+1)T_c} r(t) f^*(t - \xi_1 - nT_c - iT_s) dt \quad (4)$$

where n is the chip index and i is the bit index. Incorporating the model for the received signal r(t) as represented in equation (3), the discrete signal at the receiver is written as:

$$r_n[i] = \sum_{k=1}^{L} \left[ \sum_{i'=-\infty}^{i} b^{(k)}[i'] p_n^{(k)}[i - i'] \right] + \eta_n[i] \quad (5)$$

where i' is the summation index and $p_n^{(k)}$ is the signature of the user k, such that $p_k[(i-i'), n]$ is the desired signal at the receiver, representing the received energy in the $n^{th}$ chip of the $i^{th}$ bit from the $i'^{th}$ bit, and is given by:

$$p_n^{(k)}[i - i'] = \sum_{n'=1}^{N} c_n^{(k)}[i'] \int_0^{T_c} \left[ \int_{-\infty}^{+\infty} h^{(k)}(t, \tau) \right. \quad (6)$$

$$\left. f(t - \tau - (\zeta_k - \zeta_1) - (i' - i)T_s - (n' - n)T_c) f^*(t) d\tau \right] dt$$

Assuming that the processing gain N is sufficiently large, i.e., $T_b \gg T_c$, then $p_k[(i-i'), n]=0$ when $i \neq i'$. Accordingly, as indicated by equation (5), the representation of the discrete received signal in vector notation is given by:

$$r[i] = \sum_{k=1}^{L} b^{(k)}[i] p^{(k)}[i] + \eta[i] \quad (7)$$

where vector r[i] is a [1×N] dimensional vector representing the signal received at the chip level from the k users during the $i^{th}$ bit. Vector $p^{(k)}[i]$ is a [1×N] dimensional vector representing the signature of each user k during the $i^{th}$ bit and vector $\eta[i]$ is a [1×N] dimensional vector representing the thermal noise corresponding to the received signal r[i]. The $i^{th}$ bit received from user k is represented by $b^{(k)}[i]$.

As previously stated, the user index k increases incrementally from 1 to L users, indicating that, for any one user, there are L−1 interfering signals. Without loss of generality, k=1 is assumed to indicate the desired user whose data bit is to be detected. The remaining L−1 sources, represented by k≠1, are considered as interfering signals (e.g., MAI). However, not all of the L−1 interfering signals necessarily represent different users. For example, the $(i-1)^{th}$ bit of the desired k=1 signal may likewise be modeled as an interfering signal (e.g., IAI).

In a conventional single user CDMA detector, incorporating Rake architecture, a received composite signal is correlated with the appropriate matched filter function pertinent to the user k to estimate the value of the corresponding transmitted data bit. The relationship between the estimated detected bit b and the vectors for the signatures and corresponding received signals is represented as:

$$\hat{b}^{(k)}[i] = (p^{(k)})^H r[i] \quad (8)$$

where $\hat{b}^{(k)}[i]$ is the estimated data bit for user k, $(p^{(k)})^H$ is the Hermitian conjugate of the signature vector $p^{(k)}$ associated with the user k, and r[i] is the received signal vector for the $i^{th}$ bit. In addition, estimation of the channel function in a conventional CDMA detector is performed through the pilot channel, based on a predefined chip sequence (usually un-modulated). However, this CDMA architecture tends to be overly complicated for a MUD because the computational complexity of the channel estimation and detection of the corresponding user signals increases exponentially as the number of users increases.

In CDMA systems, when the spreading code s is the same for each data bit, the chip sequence c[0038] is independent of i. Each of the signatures p is therefore received only on the channel parameters that vary from one bit to the next. Although embodiments of the invention include different channel estimation schemes, for purposes of simplifying the explanation, a stationary channel model is assumed. For example, in W-CDMA, a long scrambling code (e.g., repeating every 10 msec. frame) may be replaced with a short scrambling code (e.g., repeating once every 0.2604 μsec. symbol). Furthermore, representation of the discrete time signal at the receiver assumes that the signal is sampled only once per chip. However, alternative detector structures for CDMA may sample the signal at alternative rates, including a rate higher than the chip duration, i.e., multiple samples per chip.

The present invention applies the foregoing principles of CDMA detection to an MMSE receiver. An MMSE receiver incorporates use of a data estimation vector D, such that the mean square error $(|b^{(1)}[i] - D^H r[i]|^2)$ of the received signal is minimized, assuming that user 1 is the desired user and that $b^{(1)}[i]$ is the signal to be detected. The estimation vector D that achieves the mean square error minimization is represented by:

$$D = \sigma_1^2 \left( \sum_{k=1}^{L} \sigma_k^2 p^{(k)} (p^{(k)})^H + \Gamma \right)^{-1} p^{(1)} \quad (9)$$

where $\Gamma$ is the covariance matrix of the AWGN, $\sigma_k$ is the average energy per data bit k, and $\sigma_1$ is the average energy for the data bit k=1. The average energy per data bit is a function of a modulation technique. The variables $\sigma_k$ and $\sigma_1$ also represent the variance of the $k^{th}$ and the $1^{st}$ data bits, respectively. Equation (9) is derived as explained in Appendix A, the contents of which are expressly incorporated herein by reference in their entireties. In particular, equation (9) matches equation (39) of Appendix A.

At a first glance, it appears from equation (9) that, in addition to the signature of the desired user signal (k=1), the MMSE receiver requires the signatures of interfering signals (k≠1) and the covariance matrix of the AWGN, in order to determine the optimum diction vector $c_k$, for the $k^{th}$ user, discussed below. However, this is not the case because the signals received by the MMSE receiver inherently include statistics, by which the interfering signal and the covariance matrix information may be sufficiently estimated, without determining the actual parameters. Consequently, the MMSE receiver need only know the signature p of the desired user (k=1).

The estimating process is accomplished, for example, considering the average of $r[i]r^H[i]$, taken over several bits, where r[i] is the received signal vector for i bits and $r^H[i]$ is the Hermitian conjugate of the vector r[i]. Typically, the average of $r[i]r^H[i]$ is taken over an entire slot (e.g., 667 μsec.), which is a small enough period of time for the MMSE receiver to assume that the channel is stationary. Therefore, the expectation value of $r[i]r^H[i]$ is shown as:

$$E\{r[i]r^H[i]\} = \begin{array}{l} \sum_{j \neq k}^{L} p^{(k)} p^{(j)H} + \\ \sum_{j=1}^{L} p^{(j)} p^{(j)H} E\{|b^{(j)}[i]|^2\} + \\ \sum_{j=1}^{L} p^{(j)} E\{\eta^H[i]\} + \\ \sum_{j=1}^{L} E\{\eta[i]\} p^{(j)H} + \\ E\{\eta[i]\eta^H[i]\} \end{array} \quad (10)$$

where it is assumed that each of the signatures corresponding to the users do not depend on the bit index i, which is true for any DS-CDMA system using short scrambling codes or PN sequences (e.g., truncated Gold codes). Additional statistical properties of the data bits are assumed, including, for example, that data bits belonging to users other than the desired user are uncorrelated and that the average value of the data bits $E\{b^{(j)}[i]\}$ is zero (for all j).

Under the assumption that the bit streams from different users are independent of each other, the expectation value of $r[i]r^H[i]$ is further simplified as:

$$E\{r[i]r^H[i]\} = \sum_{j=1}^{L} \sigma_j^2 p^{(j)} p^{(j)H} + \Gamma \quad (11a)$$

Substituting the relationship of equation (11a) into equation (9), the data estimation vector D may be represented as:

$$D = \sigma_1^2 [E\{r[i]r^H[i]\}]^{-1} p^{(1)}. \quad (11b)$$

Therefore, as stated above, the MMSE receiver for the $k^{th}$ user (e.g., k=1) is required to know only the signature of the $k^{th}$ user (e.g., $p^{(1)}$), and the remaining statics are derived by taking the average of the received signal $r[i]r^H[i]$ over multiple bits. In an alternative embodiment, the averaging is performed over a training sequence, as well as over the actual data sequence.

As stated above, a significant drawback of conventional adaptive MMSE receivers is the need for a training sequence. In particular, a training sequence is a series of known bits transmitted by the transmitter and used by the receiver to estimate the channel h(τ, t). The estimated channel h(τ, t) relates the chip sequence of the desired signal $c_k$ (at the transmitter) and the signature of the desired signal $p_k[i'-i, n]$ at the receiver, as shown, for example in equation (6). Generally, the training sequence is a time multiplexed signal and therefore independent of the data signals.

The adaptive MMSE receiver 200 of the present invention does not use a training signal. Instead, a common pilot channel and/or a dedicated pilot channel are used to estimate the channel, similar to those used in CDMA systems. According to the present invention, the channel estimate is used to determine the signature of the desired signal.

One drawback of relying on code multiplexed pilot signals is that a common pilot channel, for example, introduces residual correlation between the desired signal and the pilot itself, due to the orthogonal relationship between the signals. In comparison, a typical time multiplexed training sequence has no orthogonality with respect to the related data signals because the training sequence is transmitted at a separate time. The residual correlation may cause some degradation in receiver performance, but the advantages of eliminating the need for a training sequence outweighs the negative effects. Furthermore, the MMSE receiver 200 of the present invention does not require significant changes in the W-CDMA protocol (physical layer or higher layers). Only minor changes relating to the pilot signal bit sequences are required, discussed below. Therefore, implementation in a W-CDMA system is greatly simplified, as compared to a training sequence-based MMSE receiver.

In an embodiment of the invention, the channel vector H of the adaptive MMSE receiver 200 is related to the spreading sequence (or chip sequence) $c^i$ and the signature $p^i$ of the $i^{th}$ user as:

$$\begin{bmatrix} p_0^i \\ p_1^i \\ p_2^i \\ \cdots \\ p_{N-1}^i \\ p_N^i \\ p_{N+1}^i \\ \cdots \\ p_{N+M-3}^i \\ p_{N+M-2}^i \\ p_{N+M-1}^i \end{bmatrix} = \begin{bmatrix} h_0 & 0 & 0 & \cdots \\ h_1 & h_0 & 0 & \cdots \\ h_2 & h_1 & h_0 & \cdots \\ \cdots & \cdots & \cdots & \cdots & \cdots & \cdots & \cdots \\ & & & \cdots & h_2 & h_1 & h_0 \\ & & & \cdots & h_3 & h_2 & h_1 \\ & & & \cdots & h_4 & h_3 & h_2 \\ \cdots & \cdots & \cdots & \cdots & \cdots & \cdots & \cdots \\ & & & \cdots & h_M & h_{M-1} & h_{M-2} \\ & & & \cdots & 0 & h_M & h_{M-1} \\ & & & \cdots & 0 & 0 & h_M \end{bmatrix} \times \begin{bmatrix} c_0^i \\ c_1^i \\ c_2^i \\ \cdots \\ c_{N-1}^i \end{bmatrix} \quad (12)$$

where N is the bit duration and M is the delay spread, in units of chips, between received bits. As indicated, the signature vector p is merely the channel's response to the spreading sequence vector c of the received data bits. Due to the delay spread of M chips, the signature vector p of each user persists well into the next data bit. In other words, the signature vector p is a [1×(N+M)] vector and the spreading sequence c is a [1×N] vector.

In an embodiment of the invention, it is assumed that the delay spread M is less than the bit duration N (i.e., the delay spread M is less than N). The received signal during the $i^{th}$ bit period is denoted as r[i]. Therefore, for the $n^{th}$ chip (n=N) during the $i^{th}$ symbol period, the received signal is represented as:

$$r_n[i] = \sum_{j=0}^{1} \left[ b^{pilot}[i-j] p_{n+jN}^{(pilot)} + b^1[i-j] p_{n+jN}^{(1)} + \sum_{k=2}^{L} b^k[i-j] p_{n+jN}^{(k)} \right] + \eta_n[i] \quad (13)$$

where the bit index j goes from 0 to 1, because it is assumed that the delay spread M is less that a bit. In alternative embodiments, the same concept can be extended to a delay spread M larger than the bit duration N.

The signature of the pilot $p^{(pilot)}$ in equation (13) may be represented, in terms of the estimated channel $\{h_k; k=0, \ldots M\}$ and the spreading sequence of the pilot $c^{(pilot)}$, such that $p_{n+jN}^{(pilot)} = h_m c_{n+jN-m}^{(pilot)}$. Likewise, the signature of the data for each user $p^{(k)}$ (including $p^{(1)}$) may be represented as $p_{n+jN}^{(k)} = h_m c_{n+jN-m}^{(k)}$. Accordingly, equation (13) is may be written as:

$$r_n[i] = \sum_{j=0}^{1} \left[ \sum_{m=0}^{M} b^{pilot}[i-j] h_m c_{n+jN-m}^{(pilot)} + \sum_{m=0}^{M} b^1[i-j] h_m c_{n+jN-m}^{(1)} + \sum_{k=2}^{L} \sum_{m=0}^{M} b^k[i-j] h_m c_{n+jN-m}^{(k)} \right] + \eta_n[i] \quad (14)$$

The spreading sequences for the pilot and the data signals are [1×N] vectors produced by the modulo 2 addition of OVSF codes of length N and PN sequence. In an embodiment of the invention, the PN sequence (or scrambling code) is based on the short Gold codes. The Gold code is repeated for each bit, keeping the spreading sequence of each bit stationary.

The OVSF code is used for orthogonalization of the different users (k=1, . . . L) within the system. The purpose of the PN sequences is to randomize the signature of each user and differentiate one transmitter (e.g., Node B base station) from the others in the network. The OVSF code for the pilot channel is assumed to be all zeros, without the loss of generality, although any other OVSF code that is orthogonal to the other codes suffices.

As discussed in regard to equation (11), for the MMSE estimation to be evaluated without knowledge of the signatures of other users, the data bits of all the users, as well as the pilot, must satisfy the statistical property: $E\{b^{(pilot)}[i]\} = E\{b^{(k)}[i]\} = 0$. The property is satisfied for the data bits because the data bits are modeled as random sequences. However, the pilot bits cannot be un-modulated. Because conventional W-CDMA systems currently recognize un-modulated pilot signals, the W-CDMA physical layer must be modified slightly. In particular, the W-CDMA protocol is changed to ensure that the pilot bits, $b^{(pilot)}[i]$, have an expectation value $E\{b^{(pilot)}[i]\} = 0$, which is obtained in response to certain predetermined bit sequences, such as $\{-1, 1, -1, 1, -1, 1, \ldots\}$ for binary phase shift key (BPSK) modulation and $\{1+i, -1+i, -1-i, -1+i, \ldots, 1+i, -1+i, -1-i, -1+i\}$ for quaternary phase shift key (QPSK) modulation.

As discussed above, the adaptive MMSE receiver 200 of the present invention follows a joint channel estimation and signal detection scheme, requiring a coarse timing estimate and short scrambling codes (i.e., the same from one bit to the next, as long as the channel is invariant). The channel estimation and the detection of the desired signal are performed jointly. In particular, the signal is estimated based on the relative phase of the data bits to the pilot bits, at the same time the channel is estimated based on the pilot bits. Similar to conventional CDMA Rake receivers, the pilot signal in the present invention provides the phase reference.

Referring to equation (14), the signal received during the $n^{th}$ chip in the $i^{th}$ bit of the transmitted signal is represented as:

$$r_n[i] = \sum_{j=0}^{1}\left[\sum_{m=0}^{M}\alpha_m[i-j]c_{n+jN-m}^{(pilot)} + \sum_{m=0}^{M}\beta_m[i-j]c_{n+jN-m}^{(1)} + \sum_{k=2}^{L}\sum_{m=0}^{M}\delta_m^k[i-j]c_{n+jN-m}^{(k)}\right] + \eta_n[i] \quad (15)$$

where $\alpha_m[i-j]$ relates to the unknown pilot bit (or pilot symbol) $b^{(pilot)}[i-j]\,h_m$; $\beta_m[i-j]$ relates to the unknown data bit (or data symbol) of the desired user $b^{(1)}[i-j]\,h_m$; and $\delta_m^k[i-j]$ relates to the unknown data bit of other users $b^{(k)}[i-j]\,h_m$. The 2(M+1) $\alpha_m[i]$ variables and the 2(M+1) $\beta_m[i]$ variables are the desired signals (pilot and data, respectively). The remaining $\alpha$ and $\beta$ variables, as well as all of the $\delta$ variables, are treated as interfering signals. The interfering signals include data bits of other users (e.g., MAI) and data and pilot bits of the same (desired) user that do not belong to the $i^{th}$ bit (e.g., ISI).

The spreading sequences of the 2(M+1) signals, represented by $$c_{n+jN-m}^{(pilot)}\big|_{j=0} \text{ and } c_{n+jN-m}^{(1)}\big|_{j=0},$$

are determined based on the scrambling code (or the PN sequence) and the spreading code s of the transmitter. As stated above, the variables $\alpha_m[i-j]$ and $\beta_m[i-j]$ for $j\neq 0$ are considered interference. Therefore, the corresponding spreading sequences are defined as:

$$c_{n+jN-m}^{(pilot)}\big|_{j=0} = \begin{cases} PN_{n-m}s_{n-m}^{(pilot)} & \text{if } 0 \leq n-m \leq N-1 \\ 0 & \text{otherwise} \end{cases} \quad (16a)$$

$$c_{n+jN-m}^{(1)}\big|_{j=0} = \begin{cases} PN_{n-m}s_{n-m}^{(1)} & \text{if } 0 \leq n-m \leq N-1 \\ 0 & \text{otherwise} \end{cases} \quad (16b)$$

where $PN_i$ is the scrambling code, $s_i^{(pilot)}$ is the OVSF spreading code of the pilot bit and $s_i^{(1)}$ is the OVSF spreading code of the data bit. In the depicted embodiment of the invention, the PN sequence is a short Gold code, for example. In alternative embodiments, the receiver may determine and store all spreading sequences of the pilot and data signals based on the initially received signals, or incrementally calculate spreading sequences upon receipt of each received pilot and data signal, in real-time.

The adaptive MMSE receiver 200 collects consecutive signals to populate estimation vectors $P_m$ and $D_m$, representing the pilot signals and the data signals, respectively. The number of signal samples collected for estimating the vectors depends on the number of chips representing each bit within the signals, discussed, for example, with respect to FIG. 4, below. Based on the relationship indicated by equation (11b), the pilot and data estimation vectors $P_m$ and $D_m$ are:

$$(P_m)_n = [E\{r[i]r^H[i]\}]^{-1}c_{n-m}^{(pilot)} \quad \text{for } n = 0, 1, \ldots N+M \quad (17a)$$

$$(D_m)_n = [E\{r[i]r^H[i]\}]^{-1}c_{n-m}^{(1)} \quad \text{for } n = 0, 1, \ldots N+M \quad (17b)$$

where $r[i]=(r_0[i], r_1[i], \ldots r_{N+M-1}[i])^T$, and $r^H[i]$ is the Hermitian conjugate of the receive vector $r[i]$.

Figure 4:
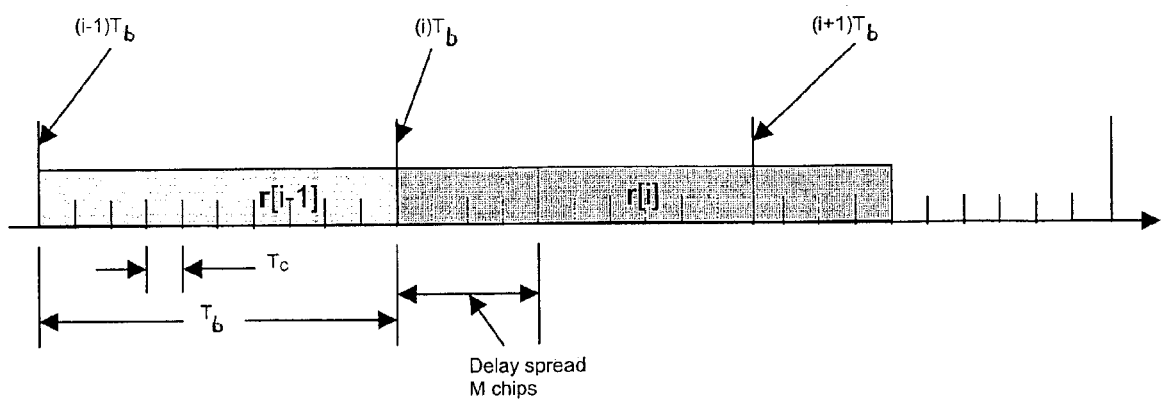
FIG. 4 is a simplified depiction of a received signal construction, according to an aspect of the present invention.

As shown in FIG. 4, the exemplary received signal vector $r[i]$ is constructed from the N+M chip samples, starting with the beginning of the $i^{th}$ bit duration $T_b$. $T_b$ is the same for the bits i−1, i and i+1. $T_c$ represents the chip duration that is equal to $\frac{1}{10}^{th}$ of $T_b$ (i.e., $T_b=10T_c$). The delay spread is four chips, or M=4. Therefore, in the example represented by FIG. 4, each of the pilot and data estimation vectors $P_m$ and $D_m$ are calculated from receive vectors based on 14 chip samples.

For a WSSUS channel model, the different multipaths corresponding to the different chip delays (m) are considered independent in terms of fading, enabling a corresponding assumption that the 2(M+1) unknown signals $\alpha_m[i]$ and $\beta_m[i]$ are likewise independent. An MMSE estimation algorithm is therefore used to estimate the unknown signals $\alpha_m[i]$ and $\beta_m[i]$ based on the received signal vector $r[i]$, the pilot estimation vector $P_m$ and the data estimation vector $D_m$, according to the following relationships, derived from equation (9), above:

$$\frac{1}{\sigma_{\alpha_m}^2}\hat{\alpha}_m[i] = P_m^H \cdot r[i] = \sum_{n=0}^{N+M-1}(P_m^H)_n r_n[i] \quad (18a)$$

$$\frac{1}{\sigma_{\beta_m}^2}\hat{\beta}_m[i] = D_m^H \cdot r[i] = \sum_{n=0}^{N+M-1}(D_m^H)_n r_n[i]$$

Therefore, the estimated values of $\alpha_m[i]$ and $\beta_m[i]$ may be shown as:

$$\hat{\alpha}_m[i]=P_m^H.r[i].\sigma_{\alpha_m}^2$$

$$\hat{\beta}_m[i]=D_m^H.r[i].\sigma_{\beta_m}^2 \quad (18b)$$

As discussed with respect to equation (15), the variables $\alpha_m[i]=(b^{(pilot)}[i])h_m$ and $\beta_m[i]=(b^{(1)}[i])h_m$, where $b^{(pilot)}[i]$ and $h_m$, $b^{(1)}[i]$ are zero mean random variables. Under this assumption, the variance $\sigma_{\alpha_m}^2$ and $\sigma_{\beta_m}^2$ corresponding to $\alpha_m[i]$ and $\beta_m[i]$, respectively, can be represented as:

$$\sigma_{\alpha_m}^2 = \sigma_{pilot}^2\sigma_{h_m}^2 \quad (19)$$

$$\sigma_{\beta_m}^2 = \sigma_1^2\sigma_{h_m}^2$$

where $\sigma_{pilot}^2 = E\{|b^{(pilot)}[i]|^2\}$ and $\sigma_1^2 = E\{|b^{(1)}[i]|^2\}$.

In accordance with the definitions of $\alpha_m$ and $\beta_m$ in relation to equation (15), the estimate desired data bit $b^{(1)}[i]$ may be represented as:

$$\hat{b}^{(1)}[i] = b^{(pilot)}[i]\sum_{m=0}^{M}\frac{\hat{\beta}_m[i]}{\hat{\alpha}_m[i]} \quad (20a)$$

Substituting the relationships indicated in equations (18b) and (19), the estimated desired data bit $\hat{b}^{(1)}[i]$ is further derived as follows:

$$\hat{b}^{(1)}[i] = b^{(pilot)}[i] \sum_{m=0}^{M} \frac{D_m^H r[i] \sigma_{\alpha_m}^2}{P_m^H r[i] \sigma_{\beta_m}^2} \quad (20b)$$

$$\hat{b}^{(1)}[i] = b^{(pilot)}[i] \sum_{m=0}^{M} \frac{\sigma_1^2 D_m^H r[i]}{\sigma_{pilot}^2 P_m^H r[i]} \quad (20c)$$

$$\hat{b}^{(1)}[i] = b^{(pilot)}[i] \sum_{m=0}^{M} \frac{\sigma_1^2}{\sigma_{pilot}^2} \frac{D_m^H}{P_m^H} \quad (20d)$$

As shown in equation (20d), the desired estimated data bit $\hat{b}^{(1)}[i]$ is generally directly related to the pilot bit $b^{(pilot)}$. In particular, the pilot bit provides the phase reference for the detected data bit, as previously described. Furthermore, the desired estimated data bit $\hat{b}^{(1)}[i]$ is directly related to the square of the variance (or average energy) of the data bit $\sigma_1^2$ divided by the square of the variance (or the average energy) of the pilot bit $\sigma_{pilot}^2$. Significantly, the $\sigma_1^2$ divided by $\sigma_{pilot}^2$ (e.g., $$\left( e.g., \frac{\sigma_1^2}{\sigma_{pilot}^2} \right)$$

is the inverse of the receiver gain, which is a known value, based on the transmitted signal. Finally, the desired estimated data bit $\hat{b}^{(1)}[i]$ is directly related to the Hermitian conjugate of the data estimation vector divided by the Hermitian conjugate of the pilot estimation vector, each of which are determined through multiple samplings of the received signals and the respective data and pilot chip sequences.

Figure 5:
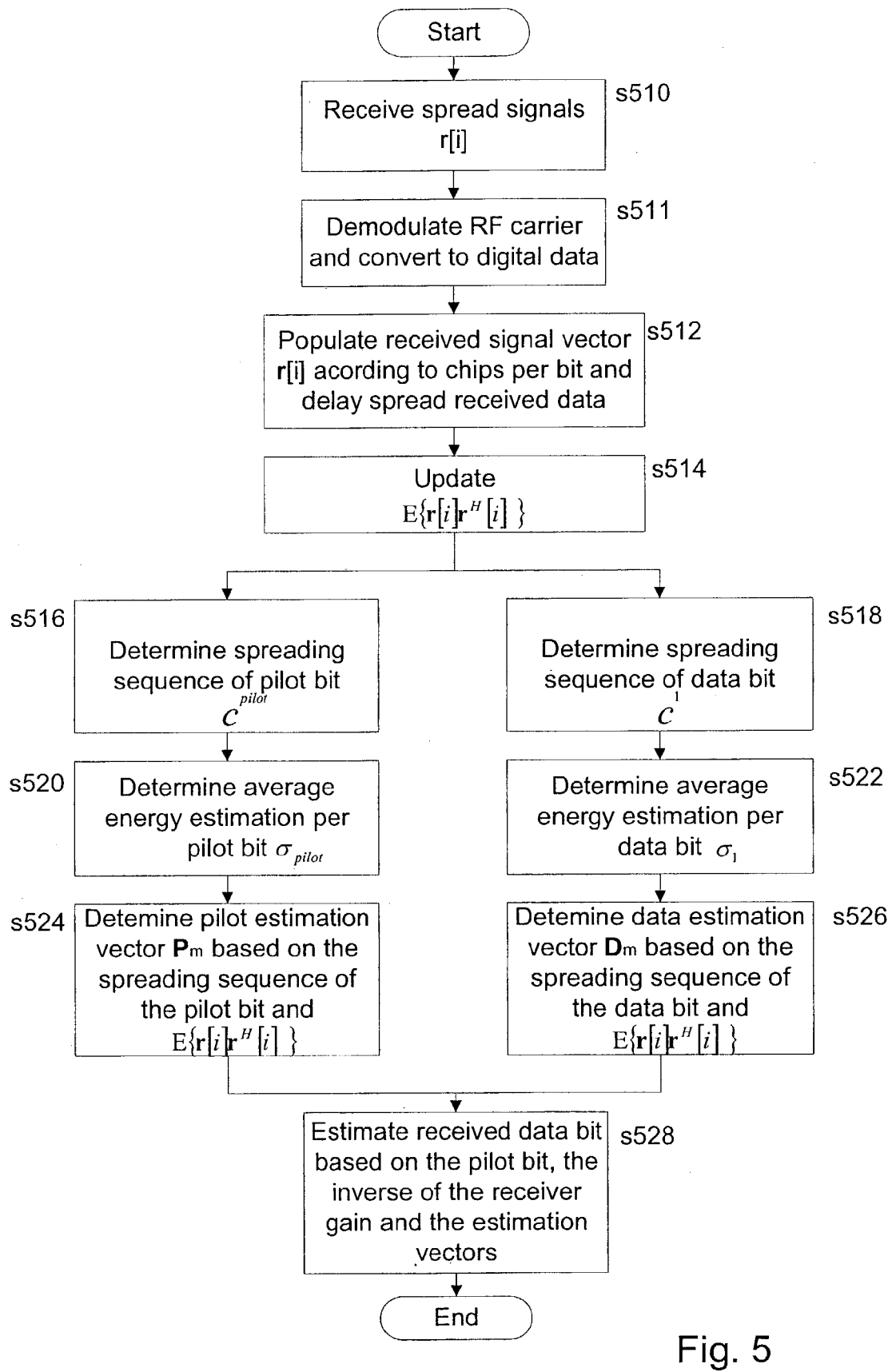
FIG. 5 is a flowchart of exemplary application logic for detecting spread spectrum signals at the exemplary MMSE receiver, according to an aspect of the present invention.

FIG. 5 depicts an exemplary flowchart of the detection process in the modified adaptive MMSE receiver 200, in accordance with the present invention. The adaptive MMSE receiver 200 receives spread signals through the antenna 201 at step s510. The receipt of the transmitted signals is continuous, although detection of each data bit is performed based on a sampling of discrete received signals, where the number of received signals in the sampling is based on a predetermined number of chips. The received signals include a pilot bit to be used for estimating the receiver channel and providing a phase reference. The signal is demodulated from the RF carrier by the multiplexer 204 and converted to digital data by the A/D converter 206 at step s511.

At step s512, the signal vector r[i] is populated based on the predetermined sampling of received signals. The vector r[i] is a [1×N] dimensional vector, indicating the values of r for each of the sampled signals, where N is the bit duration. The Hermitian conjugate $r^H[i]$ of the signal vector r[i] is likewise determined, enabling the update of the expectation value $E\{r[i]r^H[i]\}$ at step s514, as indicated at equation 11(b).

The channel estimator 210 and the data bit estimator 212 simultaneously process the received signal. Steps s516, s520 and s524 are performed by the channel estimator 210, while steps s518, s520 and s526 are performed by the data bit estimator 212. At step s516, the channel estimator 210 determines the spreading sequence of the pilot bit $c^{pilot}$. In alternative embodiments, the pilot bit may be a common pilot bit directed to the entire transmitted signal, or a dedicated pilot bit directed to the desired data bit $c^1$ at step s518. The spreading sequences are generally known quantities, which may be determined based on initial received signal information, for example, and used over the duration of the transmission. The spreading sequences may also be calculated in accordance with equations (16a) and (16b), above.

At steps s520 and s522, the channel estimator 210 determines the average energy estimation per pilot bit $\sigma_{pilot}$ and the data bit detector 210 determines the average energy estimation per data bit $\sigma_1$, respectively. In an embodiment of the invention, the receiver 200 simply determines the ratio of the average energy estimation of the pilot bit to the average energy estimation of the data bit to identify the receiver gain.

At step s524, the estimation vector $P_m$ is calculated based on the expectation value $E\{r[i]r^H[i]\}$ and the spreading sequence of the pilot bit $c^{pilot}$. Likewise, at step s526, $D_m$ is calculated based on the expectation value $E\{r[i]r^H[i]\}$ and the spreading sequence of the data bit $c^1$. The calculation of $P_m$ and $D_m$ are performed according to equations (17a) and (17b).

At step s528, the received data bit is detected by estimating the value of the data bit $\hat{b}^{(1)}$ based on a phase difference between the data bit and the pilot bit $b^{(pilot)}$, the average energy estimation per pilot bit $\sigma_{pilot}$ and data bit $\sigma_1$, and the pilot and data estimation vectors $P_m$ and $D_m$. In an embodiment of the invention, detection of the estimated data bit in step s528 is performed in accordance with equation 20(d), where the desired relationship between the average energy estimation per pilot bit $\sigma_{pilot}$ and the average energy estimation per data bit $\sigma_1$ is obtained using the inverse of the gain of the receiver 200.

In an alternative embodiment, as depicted in FIG. 2, detection of the estimated data bit in step s528 is performed in accordance with equation 20(a). In particular, the values of $\alpha$ and $\beta$ are respectively determined by the channel estimator 210 and the data bit estimator 212, in accordance with equation (18b), for each of the M chips comprising the transmitted data bit. A total of M+1 dividers, of which only dividers 220, 222 and 224 are pictured, respectively divide each $\beta$ value by each corresponding $\alpha$ value, from m=0 through m=M. The output of each of the dividers (e.g., dividers 220, 222 and 224) are added at the summation block 230 and adjusted for phase difference in reference to the pilot bit $b^{(pilot)}$. The resulting output 232 is the estimated detected data bit $\hat{b}^{(1)}$.

Significantly, the pilot aided, simultaneous channel estimation and MMSE detection of the present invention is fairly resilient to Doppler effects. As described above, the receiver channel is assumed to be stationary for the duration during which $E\{r[i]r^H[i]\}$ is evaluated, which may include several bits. In the exemplary embodiment, the channel has been set to one slot. The Doppler effect generally prevents the channel from being modeled in this fashion because a Doppler related phase shift $e^{j2\pi\Delta ft}$ is typically added to each received signal sample. In other words, each received signal sample $r_n[i]$ must be modified to be $r_n[i] \; e^{j2\pi\Delta f(iTs+nTc)}$. However, the Doppler effect does not alter the estimation process in the present invention because the data signal estimate is derived, in part, from phase reference to the pilot signal. Because both the pilot phase and data phase are multiplied by $e^{j2\pi\Delta ft}$, the overall estimate is unaffected by Doppler.

Although the invention has been described with reference to several exemplary embodiments, it is understood that the words that have been used are words of description and illustration, rather than words' of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for cellular networks (cdma2000, IS-95, W-CDMA) represent examples of the state of the art. Such standards are periodically superseded by faster or more efficient equivalents having essentially the same functions. Accordingly, replacement standards and protocols having the same functions are considered equivalents.

Appendix A: Minimum Mean Square Error (MMSE) Receivers

In this section the basic model for a MMSE receiver and some of its performance related have been dealt with. The received signal, which is a composite of the signals from all the users and the additive white Gaussian noise can be modeled as:

$$r[i] = \sum_{k=1}^{L} b^{(k)}[i] p^{(k)}[i] + \eta[i] \quad (1.31)$$

In this representation r is the 1×N dimensional vector corresponding to the received signal. Also $b^{(k)}[i]$ is the $i^{th}$ symbol and $p^{(k)}[i]$ is the signature of the $k^{th}$ user. The index k runs from 1 to L indicating that there are L−1 interferers. Without any loss of generality we can assume that k=1 indicates the desired user whose symbol is to be detected. The rest of L−1 sources are considered as interferers. Note that not all of the L−1 interfering symbols represent L−1 different users, e.g. the $(i-1)^{th}$ bit of the user 1 can also be modeled as an interfere The dimension of sampled signal r at this point are arbitrary depending on several factor such as spreading factor, delay spread, number of samples/chip to name a few. A schematic illustration of this is provided in FIG. 2. Similarly $p^{(k)}[i]$ is the contribution from $k^{th}$ signal source to the $i^{th}$ received signal. The signature of each source at the receiver depends on several factors such as spreading sequence, the channel impulse response, the Tx and Rx filters etc.

The variable $b^{(k)}[i]$ is the $i^{th}$ information symbol of user 'k' that is used to modulate the spreading signature of the. An interesting conclusion that the user can draw from here is that a synchronous and an asynchronous system can be developed based on the same model, with a asynchronous system being modeled with larger number of interfering information symbols, i.e. the different values of the variable 'k' can not only represent different users but also different information bits from the same user if the delay profile is larger than a symbol duration. This non-discriminating representation assumes that the information symbols from a given user are completely uncorrelated, i.e. the correlation between 2 different information symbols from the same user is identical to that of 2 information symbols from 2 different users making them indistinguishable.

A more detailed derivation of $p^{(k)}[i]$ based on the channel profile and the spreading signatures has been discussed in Section 03. For the remainder of the section it will be assume that $b^{(1)}[i]$ is the desired information symbol which the system is trying to detect and all the other information symbols are interferers. Any receiver for such a CDMA system estimates the signal by the form:

$$\hat{b}^{(1)}[i] = D^H \cdot r[i] \quad (32)$$

Where $D^H = [d_0, d_1, \ldots d_{N+M-1}]$ is the estimation vector. For the case of a correlating detector the estimation vector is the same as the signature of the signal, i.e. $D^H = p^{(1)H}$, which results in an estimate of:

$$\hat{b}^{(1)}[i] = b^{(1)}[i] + \sum_{k=2}^{K} b^{(k)}[i](p^{(l)})^H \cdot p^{(l)} + (p^{(l)})^H \eta[i] \quad (33)$$

The $2^{nd}$ term in this estimate is the interference arising from other users, and the $3^{rd}$ term is the noise. The presence of the interference from other signals, which in case of a multiple access CDMA system is called the Multi Access Interference (MAI) is the limiting term in the performance of the system. This also causes the well known near far problem of CDMA systems.

An MMSE receiver instead tires to minimize the mean square error, i.e the estimation vector c is chosen such that it minimizes the MSE (means square error):

$$E\{(|\hat{b}^{(k)}[i] - b^{(k)}[i]|)^2\} = \quad (34)$$

$$E\{(|b^{(l)}[i]|)^2\}(|D^H p^{(1)} - 1|)^2 + \sum_{k=2}^{K} \{(|\hat{b}^{(k)}[i]|)^2\}(|D^H p^{(k)}|)^2 + D^H \Gamma D$$

This representation of the MSE assumes that the mean expectation of the symbol =0 for all signals, i.e. $E\{b^{(k)[i]}\}=0$, which is not an unreasonable assumption for PSK or QAM symbols.

Thus the average energy per symbol $E\{(b^{(k)}[i])^2\}$ can be written as the variance ($\sigma_k^2$). The matrix t is the covariance matrix of the Gaussian noise $E\{\eta[i]\eta^H[i]\}$. For the remainder of the derivation of the estimation vector and performance analysis of such receivers it is easier to express the MSE in terms of the vector components $d_m$, $p_m^{(pilot)}$, and $P_m^{(k)}$.

The MSE can also be written as:

$$\sigma_1^2 \left[ \sum_{n,m=0}^{N+M-1} d_n d_m^* p_n^{(l)} p_m^{(1)*} + 1 \sum_{n=1}^{N+M-1} (d_n p_n^{(1)} + d_n^* p_n^{(1)*}) \right] + \quad (35)$$

$$\sum_{k=2}^{l} \sigma_k^2 \left[ \sum_{n,m=0}^{N+M-1} d_n d_m^* p_n^{(k)} p_m^{(k)*} \right] + \sum_{m,n=0}^{N+M-1} d_m \Gamma_{mn} d_n^*$$

Since the estimation vector $D^H=[d_0, d_1, \ldots d_{N+M-1}]$ is chosen such that the MSE is minimized all the partial derivative of MSE w.r.t. $d_m$ {m=0, 1, 2, ... N+M−1} must vanish, which implies:

$$\frac{\partial MSE}{\partial d_m} = \frac{\partial MSE}{\partial d_m^*} = 0 \text{ for all } m\{0, 1, 2, \ldots N+M-1\} \quad (36)$$

Using this criteria in (35) we get:

$$\frac{\partial MSE}{\partial d_j} = \sigma_1^2 p_j^{(1)} \left[ \sum_{m=0}^{N+M-1} d_m^* p_m^{(1)*} - 1 \right] + \quad (37)$$

$$\sum_{k=2}^{l} \sigma_k^2 p_j^{(k)} \left[ \sum_{m=0}^{N+M-1} d_m^* p_m^{(k)*} \right] + \sum_{m=0}^{N+M-1} \Gamma_{jm} d_m^* = 0$$

The equivalent representation of (37) in terms of the vectors is:

$$\sigma_1^2 p^{(1)} [(p^{(1)})^H D - 1] + \left[ \sum_{k=2}^{L} \sigma_k^2 (p^{(k)})^H p^{(k)} + \Gamma \right] D = 0 \quad (38)$$

The matrix $$\sum_{k=1}^{L} \sigma_k^2 (p^{(k)})^H p^{(k)} + \Gamma$$

is from here onwards is referred to as A. Thus the any solution of (38) minimizes the MSE, whether or not A happens to be non-singular. However when A is non-singular a closed for solution be found for D which satisfies (38) i.e. provides the MMSE estimate. If A is non-singular then a closed for expression can be found for D as:

$$AD + \sigma_1^2 p^{(1)} (p^{(1)})^H D = \quad (39)$$

$$\sigma_1^2 p^{(1)} \Rightarrow \sigma_1^2 \left( \sum_{k=1}^{L} \sigma_k^2 p^{(k)} (p^{(k)})^H + \Gamma \right)^{-1} p^{(1)} = D$$

A solution to (39) is the MMSE estimation vector and can be used with the received signal as shown in (32) to estimate the symbol $b^{(1)}[i]$. At a first glance it would appear that the receiver is required to know the signature of the desired signal $p^{(1)}$, as well as the signature of the interfering signals, i.e. $p^{(k)}$. However this is not always the case provided that all the signals satisfy certain properties, namely $E\{b^{(k)}[i]\}=0$. Under these conditions the receiver would be required only to know the signature of the desired signal in order to ar-ive at an MMSE estimate.

For this particular choice of D, which minimizes the MSE, the MMSE is given by:

$$MMSE = 1 - \sigma_1^2 [2 - \sigma_1^2] p^{(1)H} A^{-1} p^{(1)} \quad (40)$$

And the SIR is given by:

$$SIR = \frac{1}{[\sigma_1^4 - 2\sigma_1^2]} [p^{(1)H} A^{-1} p^{(1)}]^{-1} = MMSE^{-1} - 1 \quad (41)$$

Thus from (40) and (41) it is obvious that the MMSE solution not only minimizes the mean square error between the transmitted information symbol $b_1$ and its estimate, it also maximizes the SIR. The maximization of the SIR is a significant benefit of the MMSE receiver structure for CDMA systems when compared to simple correlation based single user detectors. In many practical situations it is quite often seen that A is ill-conditioned, i.e. Singular, and thus $A^{-1}$ does not exist. This can happen if the number of interferers L−1 is less than the dimension of the signal vectors N, i.e. does not span $R^N$ and the covariance matrix of the noise $\Gamma$ is not positive definite[6]. In such a case an alternate approach needs to be applied to evaluate c, the estimation vector.

[6] In the case of AWGN, the covariance matrix $\Gamma$ is simply No/2×I[N×N] which is positive definite. Thus even of the interference vectors do not span the full $R^N$, the AWGN makes all the samples independent, i.e. A is non-singular. In such a case the regular derivation of the estimation vector a can be applied.

Appendix B—Time Varying Channel Modes

As addressed briefly before, the most challenging aspect of wireless communication is the nature of the channel. Various effects such as multi-path propagation, Doppler effects, frequency drifts, and sampling jitters to name a few, give rise to a significant amount of spectral distortion between the received and transmitted versions of the signal. Mobility in addition makes this channel model time-variant. Under these conditions there are a few known ways to mitigate this effect.

1] Channel Estimation: In this scheme of techniques a known signal is multiplexed with the signal containing the information. This known signal, often called the pilot, or training sequences allows the receiver to estimate the channel function on a periodic basis. Depending on the nature of the physical layer, the multiplexing of the information signal with the pilot signal (or training sequence) can be done in the time domain (as is done in GSM or IS-136) or in the code domain (as is done in IS-95, W-CDMA) or both. Various aspects of the channel estimation, such as the signal strength, estimation algorithm, periodicity all depend on the underlying theoretical model of the channel that is expected to capture all the relevant aspects of the actual channel behavior. This highlights the need for understanding the time-variant nature of the channel mode in advance.

2] Modulation Techniques and Proper Design of the Physical Layer: By carefully designing the physical layer and appropriate choice of the modulation technique some of the distortions created by the wireless channel can be combated. One such example is the OFDM modulation technique. The very nature of the OFDM modulation makes it resilient to spectral distortions created by multi-path propagation (delay spread). However the sensitivity of OFDM systems to Doppler Spread and frequency drift is stronger than other systems. Some other such techniques have been developed that mitigate some of the spectral distortions of the wireless channel by proper design of the physical layer.

In this section some of the known models for the time-varying wireless channel have been considered. The first pioneering work towards developing a model for a time-varying wireless channel was done by Belo in 1963. He showed that all aspects of a wideband channel can be captured in the time-varying impulse response function h(t, τ), where the received signal y(t) can be written as:

$$y(t) = \int_{-\infty}^{t} h(t, \tau) x(t-\tau) \, d\tau \quad (1)$$

Where x(t) is the transmitted signal at time The model in (1) assumes a causal model, i.e. the received signal at time 't' does not depend on the transmitted signal after 't'. The time varying nature of the channel can also be captured by the following system function:

1] time-varying transfer function $$H(t, f) = \int_{-\infty}^{+\infty} h(t, \tau) e^{-j2\pi f \tau} \, d\tau$$

2] delay-Doppler spread function $$S(v, \tau) = \int_{-\infty}^{+\infty} h(t, \tau) e^{-j2\pi v t} \, d\tau$$

3] output Doppler-spread junction $$Q(v, f) = \int_{-\infty}^{+\infty} \int_{-\infty}^{+\infty} h(t, \tau) e^{-j2\pi(f\tau + vt)} \, d\tau \, dt$$

When the bandwidth of the transmitted signal is greater than the coherence bandwidth of the channel, it is possible for the system to resolve some of the different paths. If the total number of resolvable paths is given by 'K', then the time-varying impulse response can be written as:

$$h(t, \tau) = \sum_{k=1}^{K} h_k(t) \delta(\tau - \tau_k(t)) \quad (2)$$

Where $h_k(t)$ is the amplitude/phase distortion, and $\tau_K(t)$ is the delay associated with the path 'k' and time 't'. Since the delay does not vary sirgnificantly over each symbol duration (i.e. the delay profile can be assumed to be quasi-static), then the amplitude/phase distortion associated with each path can be modeled by a linear combination of sinusoids (i.e. modeled as a Rayleigh Rician channel).

$$h_k(t) = \sum_{p=1}^{P} h_{k,p} e^{j2\pi f_{k,p} t} \quad (3)$$

It is assumed that all the paths have different delay/Doppler values. Any two paths having the same delay/Doppler values can he combined under a single path in this representation.

(a) Discrete Time Representation

A continuous time representation of a wireless channel is rarely of any use as far as signal processing is concerned. This brings about the need for a discrete time representation of the channel. The continuous time signal can be related to the discrete symbol sequence x[k] as:

$$x(t) = \sum_{k=-\infty}^{+\infty} x[k] g_T(t - kT_s) \quad (4)$$

Where $g_T(t)$ is the transmit lowpass (baseband) filter, whose bandwidth is directly proportional to the symbol. If the channel was such that no distortions were created upon transmission, then the transmit sequence of symbols x[k] can be retrieved directly by proper sampling of the analog signal. At the receive end, the analog signal is first passed through a lowpass filter and then sampled. The sampled output can be written as:

$$y[n] = \sum_{k=-\infty}^{+\infty} h[n, n-k] \, x[k] \quad (5)$$

Where the discrete impulse response function can be related to the continuous-time model and the transmit and receive lowpass filter functions $g_T(t)$, and $g_R(t)$ respectively, as:

$$h[n, n-k] = \int_{-\infty}^{+\infty} \int_{-\infty}^{+\infty} g_R(nT_s - t)g_T(t - \tau - kT_s)h(t, \tau)dt d\tau \quad (6)$$

The reader should note that the transmit and receive filter function are clubbed together with the physical channel function in this model. Using the channel model for wideband systems as shown in (3) it can be shown that the discrete time model for such a quasi-stationary wideband channel is:

$$h[n, k] = \sum_{g=0}^{L} h_q e^{j2\pi f_q(2n-k+\tau_q)} \text{sinc}[\pi(k - \tau_q)] \quad (7)$$

It must be noted that in this representation the delay $\tau_q$ and the Doppler $f_q$ are normalized to the symbol duration $T_S$, i.e. $\tau_q \rightarrow \tau_q/T_S$ and $f_q \rightarrow f_{q \times TS}$. L is the total number of distinct path, each representing a different point in the delay-Doppler plane.

(b) Stochastic Channel Models

The discrete-time channel model with finite impulse response of order L, allows the received symbols and the transmitted symbols to be related by a finite dimensional channel matrix. The specific properties and the model of the channel are included in the matrix representation of the channel as shown in (1–7). While this approach is good in describing a specific channel model it fails to capture the global characteristics of practical time-varying channels, i.e. they are too specific to each case. A statistical model incorporating a 2D stochastic process (one dimension for Doppler and one for delay) is required to generate a more realistic mode that is capable of providing global performance measures such as outage probability, BER, etc. In general, the full characterization of a time varying channel requires the joint probability density function (pdf) of a set or random variables extracted from the channel impulse response function. However this may be quite a cumbersome approach especially when the pdf deviates from a Gaussian distribution. Some simple assumptions can be made at this stage to simplify the problem. An easier approach, as indicated by Bello (1963) is to define the correlations of the channel function defined in the previous section. A generalized correlation function for the channel function can be defined as:

$$R_h(t_1, t_2; \tau_1, \tau_2) = E\{h(t_1, \tau_1)h^*(t_2, \tau_2)\} \quad (8)$$

For most wireless channels it is often assumed that the channel is wide sense stationary, i.e. the correlation function depends no explicitly on $t_1$, and $t_2$, but rather on the difference between the two. If it is also assumed that two paths corresponding to two different delays $\tau_1$, and $\tau_2$ are completely uncorrelated, then the correlation function in the delay domain is a delta function. A combination of these two assumptions leads to the wide sense stationary with uncorrelated scattering (WSSUS) channel model.

$$R_h(t_1, t_2; \tau_1, \tau_2) = P_h(t_1 - t_2; \tau_1)\delta(\tau_1 - \tau_2) \quad (9)$$

This naturally brings about the concept of the power-delay profile. The power delay profile $\xi(\tau)$ represents the amount of the power that arrives in the path with delay T. This is given by:

$$\xi(\tau) = E\{h^*(t, \tau)\} = p_h(0; \tau) \quad (10)$$

The channel average delay and the delay spread can then be defined by this power delay profile as:

$$D = \frac{\int_0^\infty \zeta(\tau) d\tau}{\int_0^\infty \zeta(\tau) d\tau}$$

$$\sigma = \sqrt{\frac{\int_0^\infty (\tau - D)^2 \zeta(\tau) d\tau}{\int_0^\infty \zeta(\tau) d\tau}}$$

For the sake of brevity the detail derivation of this result is omitted in the main section of the document[1]. The coherence bandwidth of the channel is defined in terms of the delay spread $$B_c = \frac{1}{2\pi\sigma}.$$

The transmission bandwidth is larger than the coherence bandwidth then the channel is known as frequency selective. In a typical urban environment it has been observed that systems such as IS-95, IS-2000, W-CDMA etc. have a transmission bandwidth larger than the coherence bandwidth. In terms of diversity and robustness this means that these systems are more resilient to delay spread. The larger the bandwidth the larger is the diversity due to frequency selective nature of the channel. This conclusion inherently assumes that the rest of the physical layer and the control plane is designed such that channel estimation is quite accurate and adaptive to the channel. If however this be not the case, then some of the advantages of the frequency selective nature of the channel will be lost.

Over a relatively small scale the amplitude of the dominant path can be characterized by a RV with a Gaussian distribution, by the virtue of the Central Limit Theorem. In fact, given a receiver bandwidth B and a symbol duration $T_s$, each dominant path having amplitude $h_q$, delay $\tau_q$, and Doppler shift $f_q$, constitutes of many path having delays that differ from $\tau_q$ by an amount smaller than ½B (sampling criteria), and a Doppler differing from $f_q$ by an amount smaller than ½$T_S$. If the number of such constituents in a path is fairly high, then the Central Limit Theorem can be invoked to represent the $h_q$ by a complex Gaussian RV.

[1] Received Signal can be expressed in terms of the channel impulse response and the transmitted signal as:

$$y(t) = \int_{-\infty}^{+\infty} h(t; \tau)x(t - \tau)d\tau$$

Thus the average received power at a given time is given by:

$$E\{y^*(t)y(t)\} = E\left\{\int_{-\infty}^{+\infty}\int_{-\infty}^{+\infty} h^*(t; \tau_1)h(t; \tau_2)x^*(t - \tau_1)x(t - \tau_2)d\tau_1 d\tau_2\right\}$$

$$\int_{-\infty}^{+\infty}\int_{-\infty}^{+\infty} E\{h^*(t; \tau_1)h(t; \tau_2)\}x^*(t - \tau_1)x(t - \tau_2)d\tau_1 d\tau_2$$

As we have seen earlier the autocorrelation properties of a WSSUS imply that:

$$E\{h^*(t;\tau_1)h(t;\tau_2)\}=\xi(\tau_1)\delta(\tau_1-\tau_2)$$

Thus under the WSSUS assumption the average power of the received signal can be related to the average power of the transmitted signal as:

$$y^*(t)y(t) = \int_{-\infty}^{+\infty} \zeta(\tau)x^*(t-\tau)x(t-\tau)d\tau$$

This explains why the function $\xi(\tau)$ is often called the power delay profile.

What is claimed is:

1. A method for detecting a spread spectrum signal, comprising a plurality of pilot bits and a corresponding plurality of data bits, at an adaptive minimum mean square error receiver, the method comprising:
   receiving the plurality of pilot bits and the corresponding plurality of data bits;
   estimating a channel using at least one of the plurality of pilot bits; and
   detecting the plurality of data bits, simultaneously with estimating the channel, based on the at least one pilot bit and an inverse of a gain of the receiver.

2. The method for detecting a spread spectrum signal according to claim 1, in which the plurality of data bits are spread in accordance with a W-CDMA format.

3. The method for detecting a spread spectrum signal according to claim 2, in which the plurality of pilot bits are spread in accordance with a modified W-CDMA format, comprising a predetermined bit sequence of alternating ones and negative ones.

4. The method for detecting a spread spectrum signal according to claim 1, in which detecting the plurality of data bits further comprise determining a phase reference with respect to the at least one pilot bit.

5. The method for detecting a spread spectrum signal according to claim 1, in which detecting the plurality of data bits is further based on a data bit estimation vector and a pilot bit estimation vector determined though sampling a predetermined number of received signals.

6. A system for detecting a spread spectrum signal, comprising a plurality of pilot bits and a corresponding plurality of data bits, received at an adaptive minimum mean square error receiver, the system comprising:
   a demodulator that demodulates the received plurality of pilot bits and the corresponding plurality of data bits;
   a channel estimator that estimates a channel using at least one of the plurality of pilot bits; and
   a bit estimator that detects the plurality of data bits, concurrently with the channel estimator estimating the channel, based on the at least one pilot bit and an inverse of a gain of the receiver.

7. The system for detecting a spread spectrum signal according to claim 6, in which the plurality of data bits are spread in accordance with a W-CDMA format.

8. The system for detecting a spread spectrum signal according to claim 7, in which the plurality of pilot bits are spread in accordance with a modified W-CDMA format, comprising a predetermined bit sequence of alternating ones and negative ones.

9. The system for detecting a spread spectrum signal according to claim 6, in which the bit estimator detects the plurality of data bits further based on a phase reference with respect to the at least one pilot bit.

10. The system for detecting a spread spectrum signal according to claim 6, in which the bit estimator detects the plurality of data bits further based on an expectation value of the received signal, determined though sampling a predetermined number of received signals.

11. A system for detecting transmitted spread spectrum data at an adaptive minimum mean square error receiver, comprising:
    a demodulator that receives and demodulates a plurality of received spread spectrum signals;
    a covariance matrix calculator that determines a received signal expectation value based on the plurality of received signals;
    a channel estimator that determines a pilot spreading sequence of the plurality of received signals and estimates at least one pilot portion of the received signals based on the pilot spreading sequence and the expectation value;
    a bit estimator that determines a bit spreading sequence of the plurality of received signals and estimates at least one data portion of the received signals based on the bit spreading sequence and the expectation value; and
    a combiner that combines the at least one pilot portion and the at least one data portion and estimates the transmitted spread spectrum data based on the combined pilot portion and data portion and a phase reference between the data portion and at least one pilot bit of the pilot portion.

12. The system for detecting transmitted spread spectrum data according to claim 11, in which the at least one pilot bit comprises a common pilot signal.

13. The system for detecting transmitted spread spectrum data according to claim 11, in which the at least one pilot bit comprises a dedicated pilot signal corresponding to the detected data.

14. A computer readable medium storing a computer program for detecting a spread spectrum signal, comprising a plurality of pilot bits and a corresponding plurality of data bits, at an adaptive minimum mean square error receiver, the program comprising:
    a receiving code segment that receives the plurality of pilot bits and the corresponding plurality of data bits;
    a channel estimating code segment that estimates a channel using at least one of the plurality of pilot bits; and
    a detecting code segment that detects the plurality of data bits, contemporaneously with the channel estimating code segment estimating the at least one of the plurality of pilot bits, based on the at least one pilot bit and an inverse of a gain of the receiver.

15. The computer readable medium according to claim 14, in which the plurality of data bits are spread in accordance with a W-CDMA format.

16. The computer readable medium according to claim 15, in which the plurality of pilot bits are spread in accordance with a modified W-CDMA format, comprising a predetermined bit sequence of alternating ones and negative ones.

17. The computer readable medium according to claim 14, in which contemporaneously detecting the plurality of data bits further comprises determining a phase reference with respect to the at least one pilot bit.

18. The computer readable medium according to claim 14, in which contemporaneously detecting the plurality of data bits is further based on a data bit estimation vector and a pilot bit estimation vector determined through sampling a predetermined number of received signals.

19. A computer readable medium storing a computer program for detecting spread spectrum signals at an adaptive minimum mean square error receiver, comprising:
- a receiving code segment that receives a plurality of spread signals comprising a pilot signal portion and a data signal portion;
- an expectation determining code segment that determines a received signal expectation value based on the plurality of spread signals;
- a pilot signal estimating code segment that estimates the pilot signal portion based on the signal expectation value and at least one pilot signal spreading sequence corresponding to the pilot signal portion;
- a data signal estimating code segment that estimates the data signal portion based on the signal expectation value and at least one data signal spreading sequence corresponding to the data signal portion; and
- a detecting code segment that detects a data bit of the data signal portion based on the estimated pilot signal portion, the estimated data signal portion and at least one pilot bit of the pilot signal portion.

20. The computer readable medium according to claim 19, in which the expectation determining code segment determines the received signal expectation value using a covariance matrix.

21. The computer readable medium according to claim 19, in which the at least one pilot bit comprises a common pilot signal.

22. The computer readable medium according to claim 19, in which the at least one pilot bit comprises a dedicated pilot signal corresponding to the detected data bit.

* * * * *